(12) United States Patent
Martin (10) Patent No.: US 12,044,058 B2
(45) Date of Patent: Jul. 23, 2024

(54) SYSTEM, APPARATUS, AND METHOD FOR STORING MATERIAL

(71) Applicant: Kevin Martin, Palisades Park, NJ (US)

(72) Inventor: Kevin Martin, Palisades Park, NJ (US)

( * ) Notice: Subject to any disclaimer, the term of this patent is extended or adjusted under 35 U.S.C. 154(b) by 389 days.

(21) Appl. No.: 17/369,186

(22) Filed: Jul. 7, 2021

(65) Prior Publication Data

US 2022/0034142 A1 Feb. 3, 2022

Related U.S. Application Data

(60) Provisional application No. 63/059,607, filed on Jul. 31, 2020.

(51) Int. Cl.
*G03B 17/56* (2021.01)
*E05B 55/00* (2006.01)
*E05F 5/06* (2006.01)

(52) U.S. Cl.
CPC ............... *E05F 5/06* (2013.01); *E05B 55/00* (2013.01); *G03B 17/561* (2013.01); *E05Y 2900/20* (2013.01)

(58) Field of Classification Search
CPC ........ B65D 50/06; B65D 5/2057; B65D 5/38; B65D 5/6655; B65D 2215/04; B65D 5/685
USPC .......................................................... 206/1.5
See application file for complete search history.

(56) References Cited

U.S. PATENT DOCUMENTS

| | | | | |
|---|---|---|---|---|
| 3,977,521 A | * | 8/1976 | Murphy | A63B 71/0045 40/606.03 |
| 4,437,713 A | * | 3/1984 | Roach | B65D 5/38 229/122 |
| 4,531,645 A | * | 7/1985 | Tisbo | B25H 3/06 211/163 |
| 5,079,797 A | * | 1/1992 | Ohshima | E05C 17/345 16/DIG. 9 |
| 6,948,788 B1 | * | 9/2005 | Tai | A47B 88/956 312/348.4 |
| 9,750,988 B1 | * | 9/2017 | Auld | A63B 47/002 |

(Continued)

OTHER PUBLICATIONS

Cabinet Parts, Soft Down Stay with Catch—White, 2008, https://www.cabinetparts.com/p/sugatsune-hinges-lid-and-flap-stays-SUGSDSC100WHT-p41713?mtm_campaign=780262739&mtm_group=43589091591&mtm_source=google_ad&mtm_medium=cpc&gad=1&gclid=EAlaIQobChMI0Mznlai-gQMVaSzUAR1fbwWEEAQYBiABEgLf8_D_BwE#productinfo.*

(Continued)

*Primary Examiner* — Ernesto A Grano
*Assistant Examiner* — Symren K Sanghera
(74) *Attorney, Agent, or Firm* — Keefe IP Law, PLLC (57) ABSTRACT

An apparatus is disclosed. The apparatus has a housing that is a rectangular prism having five substantially flat sides and an open side that is open to a cavity formed by the housing, an intermediate member disposed in the housing and dividing the cavity into a first cavity and a second cavity, a member that is movably attached to the housing via at least one movable connector, the member movable about the at least one movable connector between an open position allowing access to the second cavity and a closed position covering the second cavity, a support assembly disposed in the second cavity and attaching the member to the housing, and a fastener assembly attached to the member and selectively locking the member to the intermediate member when the member is in the closed position.

20 Claims, 7 Drawing Sheets

(56) References Cited

U.S. PATENT DOCUMENTS

| | | | |
|---|---|---|---|
| 2011/0234066 A1* | 9/2011 | Celano | A47B 96/00 |
| | | | 312/351.1 |
| 2013/0145695 A1* | 6/2013 | Wach | E05F 5/02 |
| | | | 49/381 |
| 2017/0022736 A1* | 1/2017 | Nguyen | E05B 57/00 |
| 2017/0074017 A1* | 3/2017 | Ficker | B65D 19/18 |
| 2019/0145143 A1* | 5/2019 | Milnes | E05F 1/10 |
| | | | 435/307.1 |
| 2022/0025686 A1* | 1/2022 | Schneider | E05D 3/142 |
| 2022/0066293 A1* | 3/2022 | Martin | F16M 11/24 |
| 2022/0170306 A1* | 6/2022 | Worthen | E05D 11/1014 |

OTHER PUBLICATIONS

Amazon, Bush Furniture Universal 2 Shelf Bookcase in Pure White, 2019, Amazon, https://www.amazon.com/Bush-Furniture-Universal-Shelf-Bookcase/dp/B072FW7QQZ (Year: 2019).*

* cited by examiner

SYSTEM, APPARATUS, AND METHOD FOR STORING MATERIAL

RELATED APPLICATIONS

This application claims the benefit of United States Provisional Patent Application No. 63/059,607 filed on Jul. 31, 2020, which is hereby incorporated by reference in its entirety.

TECHNICAL FIELD

The present disclosure generally relates to a system, apparatus, and method for storing, and more particularly to a system, apparatus, and method for storing material.

BACKGROUND

Filmmaking and video production work involves camera work that often involves supporting a camera and other equipment in unusual or challenging positions. Technicians such as grips typically build and maintain support equipment for cameras. Some types of support equipment typically used in camera work includes boxes or crates used by grips in supporting cameras.

Conventional boxes and crates used in camera work by technicians such as grips typically do not include storage space for use by film and video personnel. Conventional systems that do include storage spaces typically involve heavy and difficult to secure configurations using drawers that slide into and out of the box or crate. Further, conventional systems that include storage spaces are relatively less versatile and durable for use by a grip as compared to non-storage boxes because the storage drawers and containers may fall out of the box or crate and the box or crate itself may break during normal use in film and video production due to the inclusion of storage spaces. That is, the presence of the storage spaces in such boxes or crates typically impedes film or video production work because the storage space adds components that makes handling of the box or crate unwieldy for technicians.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to an apparatus. The apparatus includes a housing that is a rectangular prism having five substantially flat sides and an open side that is open to a cavity formed by the housing, an intermediate member disposed in the housing and dividing the cavity into a first cavity and a second cavity, a member that is movably attached to the housing via at least one movable connector, the member movable about the at least one movable connector between an open position allowing access to the second cavity and a closed position covering the second cavity, a support assembly disposed in the second cavity and attaching the member to the housing, and a fastener assembly attached to the member and selectively locking the member to the intermediate member when the member is in the closed position. The member forms a recess at the open side of the housing when the member is in the closed position covering the second cavity. The fastener assembly and the at least one movable connector are disposed in the recess when the member is in the closed position.

In another aspect, the present disclosure is directed to a method. The method includes providing a housing that is a rectangular box having five substantially flat sides and an open side that is open to a cavity formed by the housing, providing an intermediate member disposed in the housing and dividing the cavity into a first cavity and a second cavity, providing a member that is movably attached to the housing via at least one movable connector, and guiding a movement of the member about the at least one movable connector between an open position allowing access to the second cavity and a closed position covering the second cavity using a support assembly that is disposed in the second cavity and that is attached between the member and the housing. The method also includes selectively locking the member to the intermediate member when the member is in the closed position using a fastener assembly attached to the member, forming a recess at the open side of the housing with the member when the member is in the closed position covering the second cavity, supporting equipment with the housing, and storing material in the second cavity.

DETAILED DESCRIPTION AND INDUSTRIAL APPLICABILITY

Figure 1:
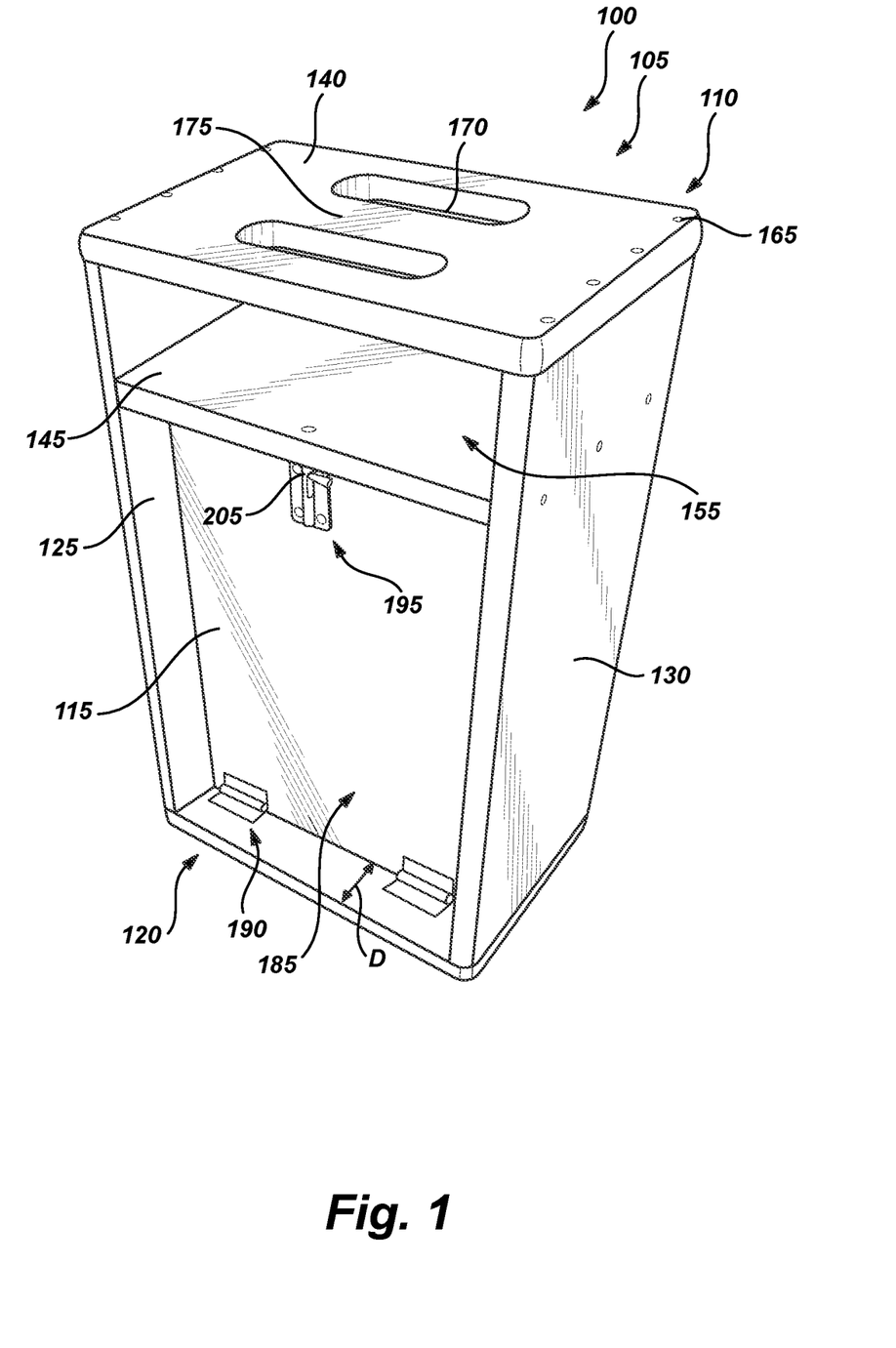
FIG. 1 is a perspective view of at least some exemplary embodiments of the present invention.
Figure 2:
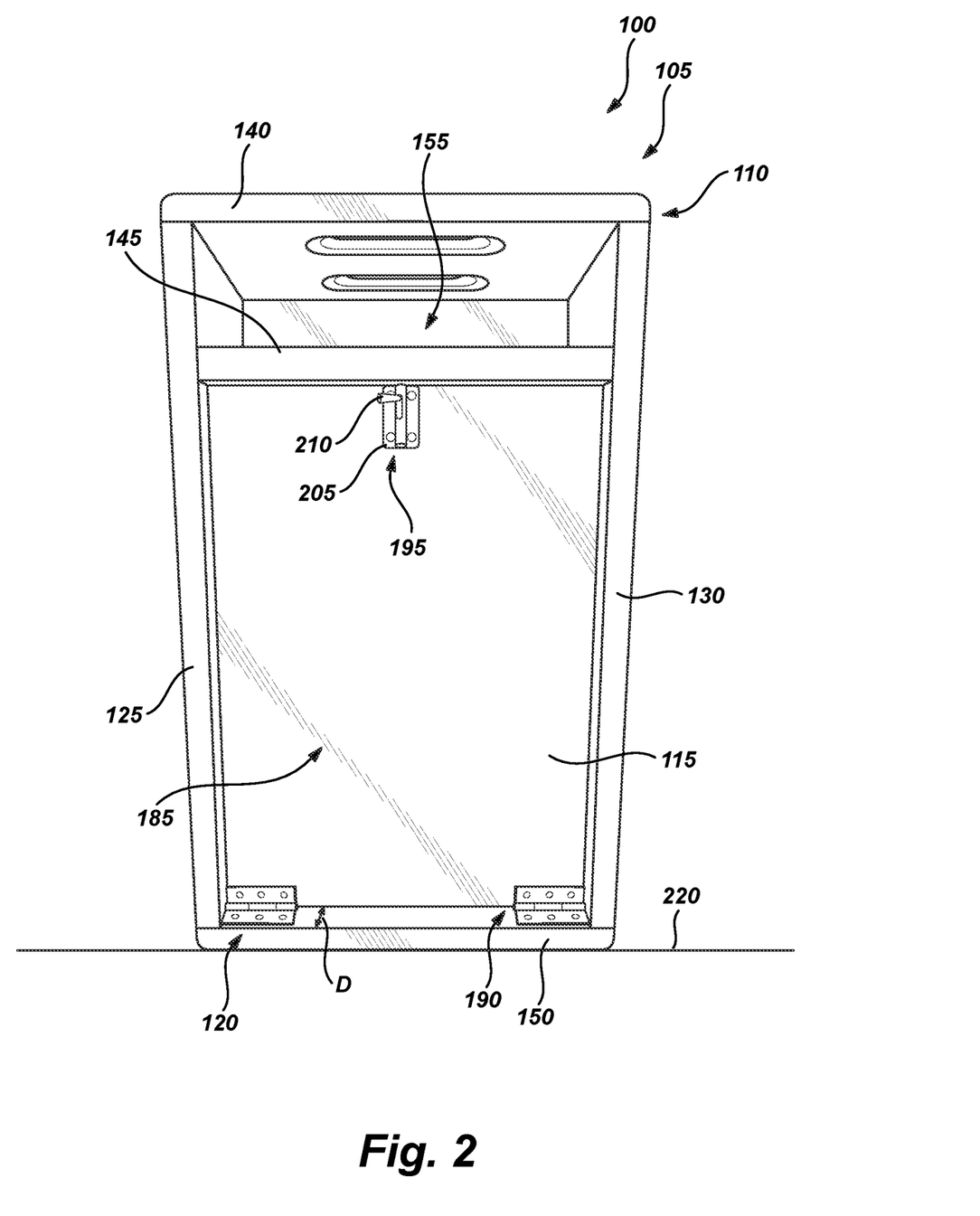
FIG. 2 is a front perspective view of at least some exemplary embodiments of the present invention.
Figure 3:
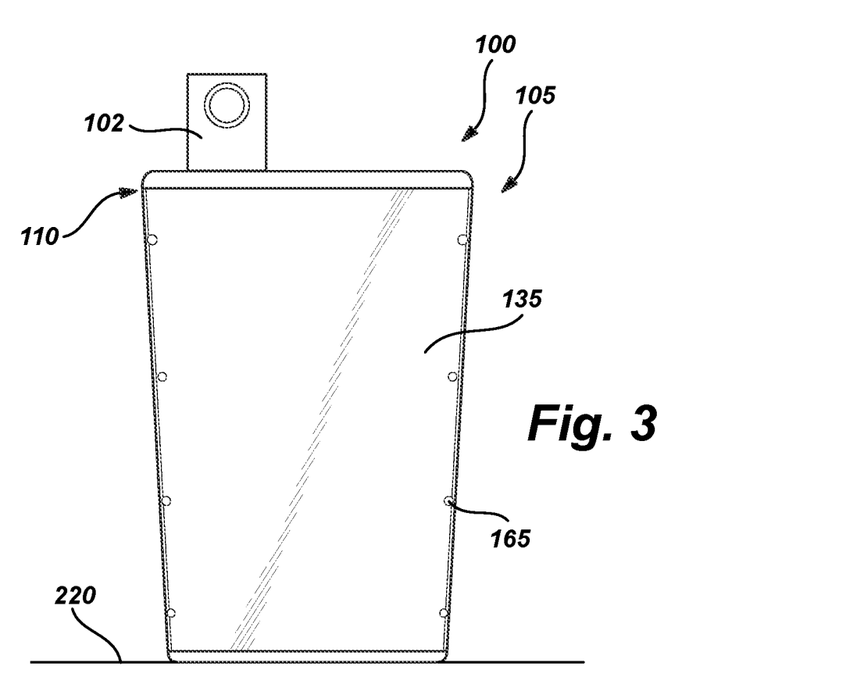
FIG. 3 is a rear view of at least some exemplary embodiments of the present invention.
Figure 4:
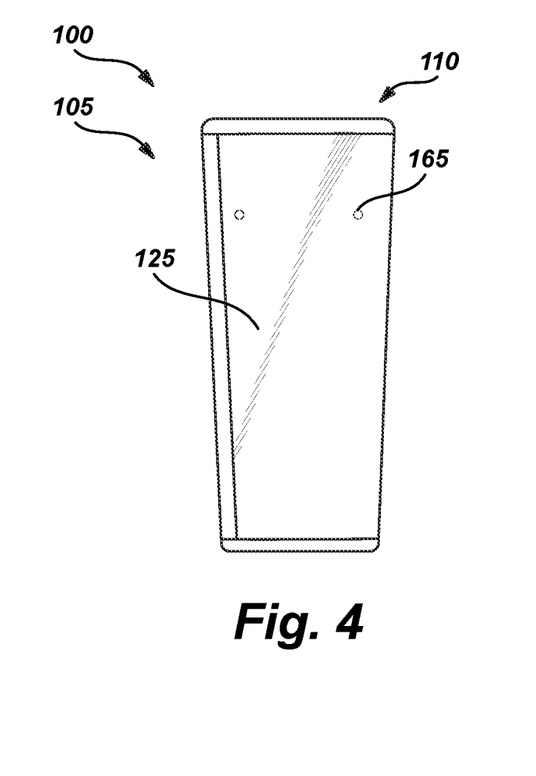
FIG. 4 is a side view of at least some exemplary embodiments of the present invention.
Figure 5:
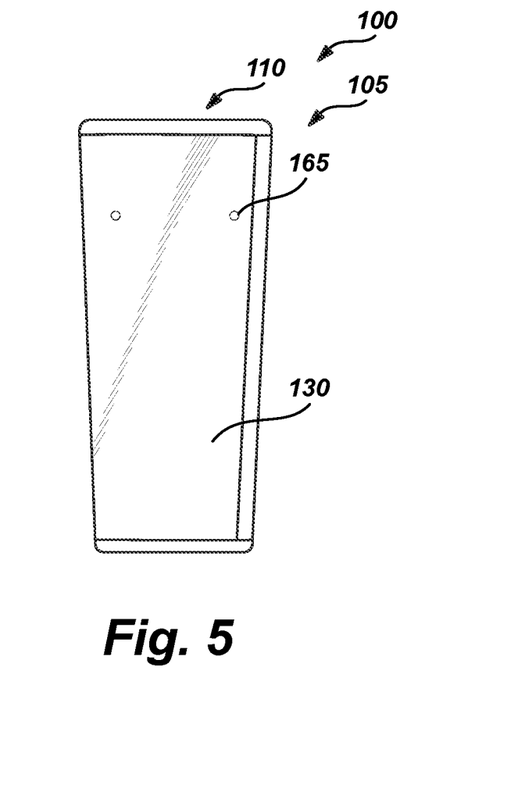
FIG. 5 is a side view of at least some exemplary embodiments of the present invention.
Figure 6:
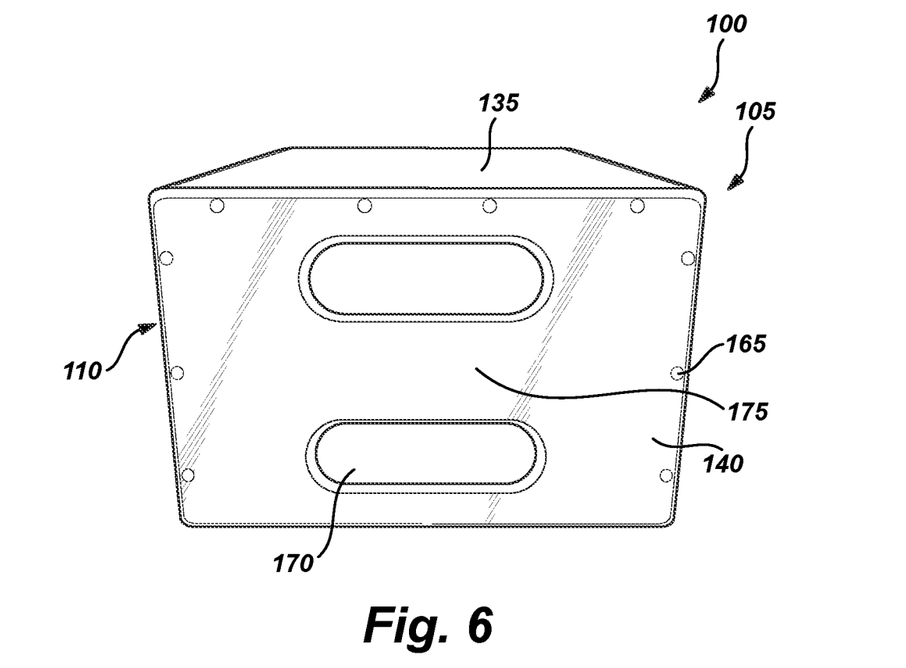
FIG. 6 is a top view of at least some exemplary embodiments of the present invention.
Figure 7:
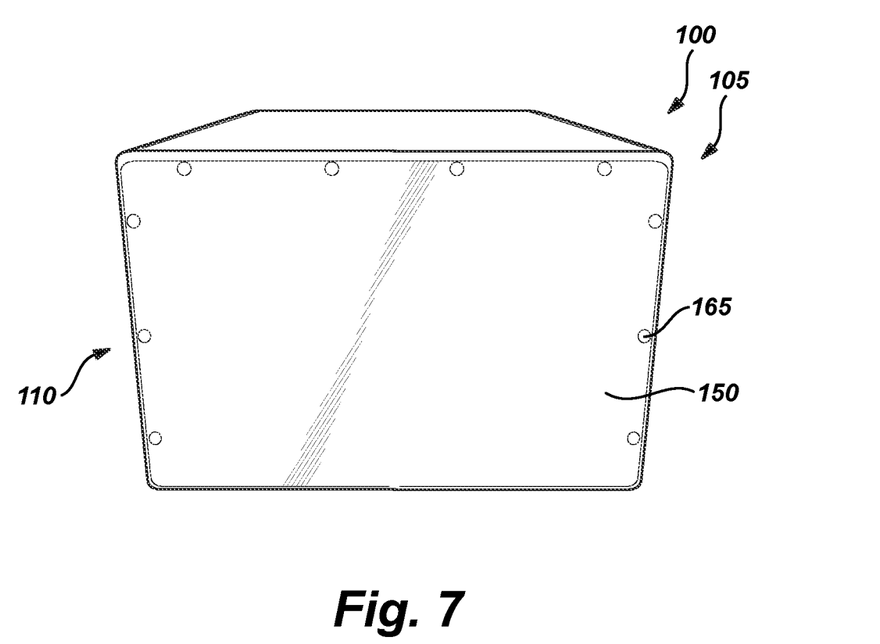
FIG. 7 is a bottom view of at least some exemplary embodiments of the present invention.

FIGS. 1-8 illustrate an exemplary embodiment of the exemplary disclosed system, apparatus, and method. System 100 may include an apparatus 105. Apparatus 105 may be an assembly for storing material and/or supporting equipment for any suitable activity. For example, apparatus 105 may be used for storing material and/or supporting equipment such as for supporting camera equipment (e.g., an object 102 such as a piece of camera equipment for example as illustrated in FIG. 3) and providing storage for technicians working in film and video production, for use by trades workers or in the construction industry by construction workers, for use in exhibitions and fairs such as trade shows or hobby conventions such as trading card shows and science fiction conventions, and/or use in any suitable activity involving storing material and/or supporting equipment or objects.

Apparatus 105 may include a body assembly 110, a member 115, and a movement assembly 120. Movement assembly 120 may provide for a movement of member 115 relative to body assembly 110.

Body assembly 110 may movably support member 115. Body assembly 110 may include a side member 125, a side member 130, a back member 135, a top member 140, an intermediate member 145, and a bottom member 150. Body assembly 110 may be formed as a rectangular prism (e.g., a rectangular box), with each set of opposite faces having substantially identical peripheral dimensions.

Figure 8:
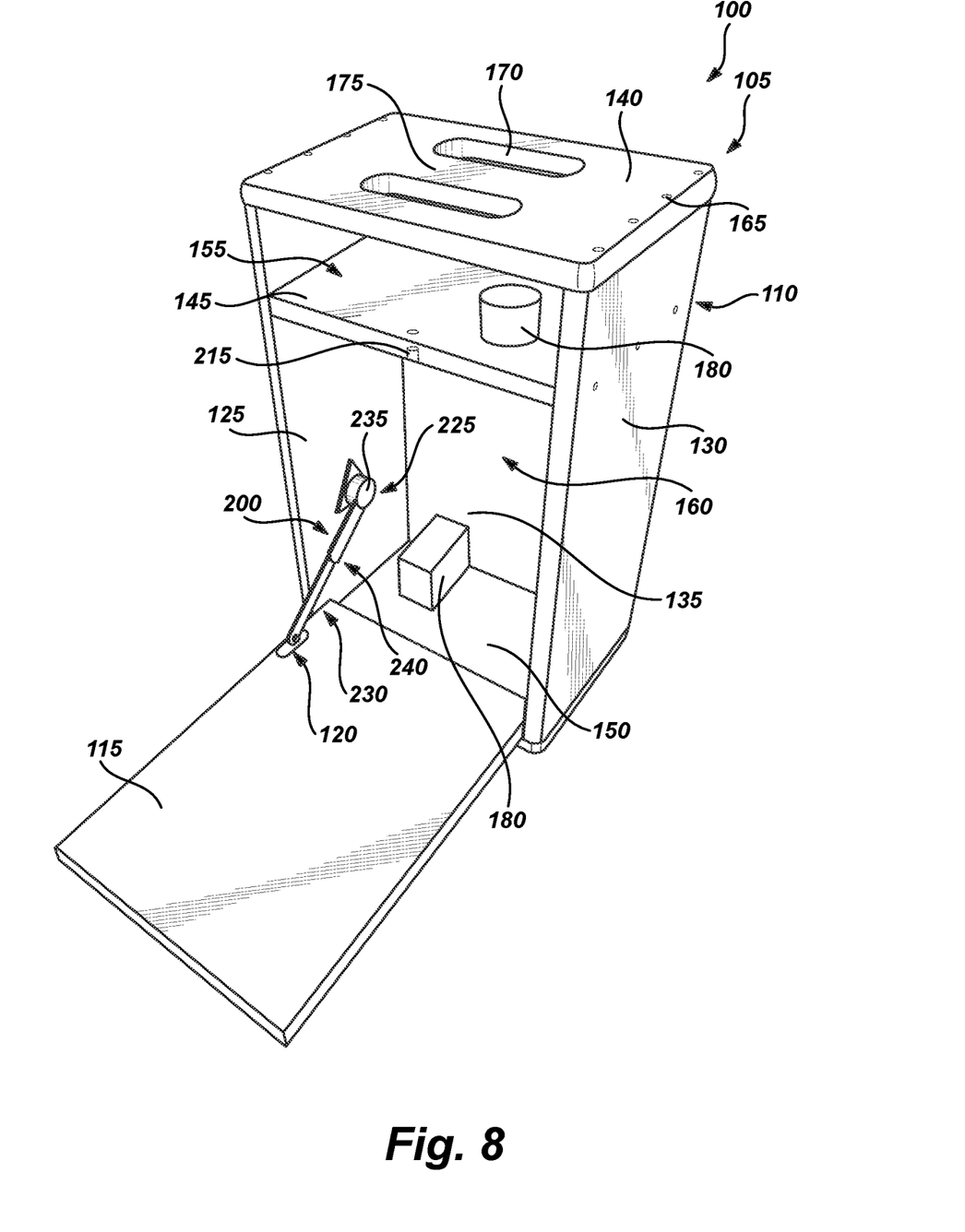
FIG. 8 is a perspective view of at least some exemplary embodiments of the present invention.

For example as illustrated in FIG. 8, side member 125, side member 130, back member 135, top member 140, intermediate member 145, and bottom member 150 may be attached together to form a cavity 155 and a cavity 160. For example, intermediate member 145 may be disposed in a cavity formed by body assembly 110 and may separate this cavity into cavity 155 and cavity 160 (e.g., intermediate member 145 may separate cavity 155 from cavity 160). Body assembly 110 may be a housing that may be a rectangular prism having five substantially flat sides (e.g., exterior surfaces of side member 125, side member 130, back member 135, top member 140, and bottom member 150) and an open side that is open to a cavity formed by the housing for example as described herein.

Side member 125, side member 130, back member 135, top member 140, intermediate member 145, and/or bottom member 150 may be formed from any suitable structural material such as, for example, wood, plastic, carbon fiber, foam material, and/or metal. For example, side member 125, side member 130, back member 135, top member 140, intermediate member 145, and/or bottom member 150 may be formed from wood material such as birch, oak, mahogany, sapele, okoume, maple, cherry, walnut, and/or any other suitable type of wood. In at least some exemplary embodiments, side member 125, side member 130, back member 135, top member 140, intermediate member 145, and/or bottom member 150 may be formed from white birch, Chinese birch, red oak, and/or white oak. Side member 125, side member 130, back member 135, top member 140, intermediate member 145, and/or bottom member 150 may be plywood. Side member 125, side member 130, back member 135, top member 140, intermediate member 145, and/or bottom member 150 may be of any suitable thickness for forming body assembly 110 such as, for example, between about ¼" and about 1", between about ½" and about 1", between about ½" and about ¾", or any other suitable thickness. In at least some exemplary embodiments, side member 125, side member 130, top member 140, intermediate member 145, and bottom member 150 may be plywood members having a thickness of about ¾" and back member 135 may be a plywood member having a thickness of about ½". For example, back member 135 may have a thickness that is less than side member 125, side member 130, top member 140, intermediate member 145, and/or bottom member 150.

Side member 125, side member 130, back member 135, top member 140, intermediate member 145, and/or bottom member 150 may be attached together via any suitable technique such as, for example, mechanical fasteners, adhesives, welding, and/or any other suitable method. In at least some exemplary embodiments, side member 125, side member 130, back member 135, top member 140, intermediate member 145, and/or bottom member 150 may be integrally formed (e.g., formed or molded as a single, integral member). In at least some exemplary embodiments, side member 125, side member 130, back member 135, top member 140, intermediate member 145, and/or bottom member 150 may be fastened via a plurality of fasteners 165 for example as illustrated in FIGS. 1-8.

Side member 125, side member 130, back member 135, top member 140, intermediate member 145, and/or bottom member 150 may be attached together so that exterior surfaces (e.g., a top, bottom, rear, and both side surfaces) of apparatus 105 may be substantially flat and smooth. Front portions of side member 125, side member 130, top member 140, intermediate member 145, and bottom member 150 may be substantially aligned and flush to provide a flat edge to support apparatus 105 when apparatus is disposed flat on a support surface (e.g., ground surface, table, or other support) with member 115 facing the support surface.

In at least some exemplary embodiments and as illustrated in FIGS. 1-8, fasteners 165 may be exposed at exterior surfaces of side member 125, side member 130, back member 135, top member 140, intermediate member 145, and/or bottom member 150. Exposed surfaces of fasteners 165 may be flush with or disposed in recesses (e.g., "buried") at exterior surfaces of side member 125, side member 130, back member 135, top member 140, intermediate member 145, and/or bottom member 150. Exterior surfaces (e.g., a top, bottom, rear, and both side surfaces) of apparatus 105 may thereby be substantially flat and smooth without fasteners 165 extending out from exterior surfaces of apparatus 105.

Fasteners 165 may be any suitable fasteners such as screws, bolts, nails, staples, and/or any other suitable fastener. In at least some exemplary embodiments, fasteners 165 may be screws of any suitable size and length (e.g., 33 mm or 40 mm wood screws). In at least some exemplary embodiments, fasteners 165 may be steel screws of between about 1" and about 2" in length (e.g., 1⅝" length) or any other suitable size.

Fasteners 165 may be countersunk into side member 125, side member 130, back member 135, top member 140, intermediate member 145, and/or bottom member 150. Fasteners 165 may be screwed into side member 125, side member 130, back member 135, top member 140, intermediate member 145, and/or bottom member 150 using guides or pilot holes (e.g., pre-drilled holes) to facilitate tightly gripping attachment between opposing surfaces of the attached members (e.g., to avoid cracking). Fasteners 165 may thereby durably attach body assembly 110 together so that apparatus 105 does not break apart or crack when dropped and used in supporting equipment such as relatively heavy camera equipment.

For example as illustrated in FIGS. 1, 2, and 8, side member 125, side member 130, back member 135, top member 140, intermediate member 145, and bottom member 150 may be attached together to form cavity 155 and cavity 160 of any desired size and configuration. Cavity 160 may be formed (e.g., bounded by) side member 125, side member 130, back member 135, intermediate member 145, and bottom member 150. Cavity 160 may have a height, which may be a distance between an interior surface of bottom member 150 facing cavity 160 and a surface of intermediate member 145 facing cavity 160, that may be between about 6" and about 24" or more, between about 12" and about 18", or between about 14" and about 16". Cavity 160 may have a width, which may be a distance between an interior surface of side member 125 facing cavity 160 and an interior surface of side member 130 facing cavity 160, that may be between about 4" and about 24" or more, between about 8" and about 16", or between about 10" and about 14". Cavity 160 may have a thickness, which may be a depth of the cavity corresponding to a width of side members 125 and 130, that may be between about 1" and about 16", between about 4" and about 14", or between about 6" and about 10". In at least some exemplary embodiments, cavity 160 may have a height of about 15", a width of between about 10" and about 11", and a thickness of about 1", about 2", about 4", or between about 7" and about 8".

Cavity 155 may be formed (e.g., bounded by) side member 125, side member 130, back member 135, intermediate member 145, and top member 140. Cavity 155 may have a height, which may be a distance between an interior surface of top member 140 facing cavity 155 and a surface of intermediate member 145 facing cavity 150, that may be between about 2" or less and about 8" or more, between about 2" and about 4", or between about 2" and about 3". Cavity 155 may have a width, which may be a distance between an interior surface of side member 125 facing cavity 155 and an interior surface of side member 130 facing cavity 155, that may be between about 4" and about 24" or more, between about 8" and about 16", or between about 10" and about 14". Cavity 155 may have a thickness, which may be a depth of the cavity corresponding to a width of side members 125 and 130, that may be between about 1" and about 16", between about 4" and about 14", or between about 6" and about 10". In at least some exemplary embodiments, cavity 155 may have a height of about 2¾", a width of between about 10" and about 11", and a thickness of about 1", about 2", about 4", or between about 7" and about 8". In at least some exemplary embodiments, cavity 160 may be between about four and about eight times larger than cavity 155 to provide for suitable storage space and to facilitate handling apparatus 105 for example as described herein. For example, cavity 160 may be between about five and about six times larger than cavity 155 to provide for suitable storage space and to facilitate handling apparatus 105 for example as described herein.

In at least some exemplary embodiments and as illustrated in the orientation of FIG. 1, body assembly 110 may have an overall height (e.g., with top member 140 at a top) of between about 12" and about 30" (e.g., about 20"), an overall width (e.g., measured along a length of top member 140 and bottom member 150) of between about 6" and about 24" (e.g., about 12"), and an overall thickness (e.g., measured along a width of side members 125 and 130) of between about 1" and about 8" (e.g., of about 1", of about 2", of about 4", or about 8"). Body assembly 110 may also have any other suitable dimensions for storing material and/or supporting equipment.

In at least some exemplary embodiments, top member 140 may include one or more apertures 170. In at least some exemplary embodiments, side member 125, side member 130, back member 135, bottom member 150, and/or member 115 may also include apertures 170. Aperture 170 may be formed by any suitable techniques such as, for example, machining (e.g., machining using computer numerical control), a jig, a handheld router, and/or any other suitable technique or combination of techniques. Similar techniques may also be used to form designs as desired in exterior surface portions of the exemplary disclosed members forming apparatus 105. Apertures 170 may provide a handle for a user such as a technician (e.g., a grip in film or video production) to move, carry, and/or position apparatus 105. A user's fingers may be received in cavity 155 while gripping a handle portion 175 of top member 140 extending between apertures 170. For example as described above, cavity 155 may have a suitable height for comfortably receiving a user's digits (e.g., fingers and/or thumb) that may extend through apertures 170 when the user grips handle portion 175.

As illustrated in FIG. 8, any desired objects or material 180 may be stored in cavities 155 and 160. Material 180 may include any desired items, material, equipment, and/or objects used in any of the exemplary disclosed industries, activities, and/or applications described herein. For example in at least some exemplary embodiments, material 180 may include tools, tape, food, paper, books, markers, clothing, cable and wire, and/or any other material used in any of the exemplary disclosed uses for apparatus 105 described herein.

Member 115 may be a movable door member (e.g., door, hatch, or gate) that may be movably mounted to body assembly 110 via movement assembly 120. Member 115 may be formed from similar material as described above regarding side member 125, side member 130, back member 135, top member 140, intermediate member 145, and bottom member 150. In at least some exemplary embodiments, member 115 may be a plywood member having a thickness of about ½" (e.g., or any other exemplary disclosed member thickness described herein). For example, member 115 may have a thickness that is less than side member 125, side member 130, top member 140, intermediate member 145, and/or bottom member 150. Also for example, member 115 may have a thickness that may be substantially equal to a thickness of back member 135. In at least some exemplary embodiments, member 115 and back member 135 may have a thickness of about ½" and side member 125, side member 130, top member 140, intermediate member 145, and bottom member 150 may each have a thickness of about ¾".

For example as illustrated in FIG. 1, member 115 may be dimensioned to fit between side member 125, side member 130, intermediate member 145, and bottom member 150, and may include length and width dimensions corresponding to the exemplary dimensions described herein (e.g., for an area of cavity 160). In at least some exemplary embodiments, member 115 may have a length of about 15" and a width of between about 10" and about 12". Member 115 may be dimensioned to substantially cover cavity 160 so that cavity 160 may be substantially completely enclosed between member 115, side members 125 and 130, back member 135, intermediate member 145, and bottom member 150 when member 115 is in the closed position illustrated in FIGS. 1 and 2.

Figure 9:
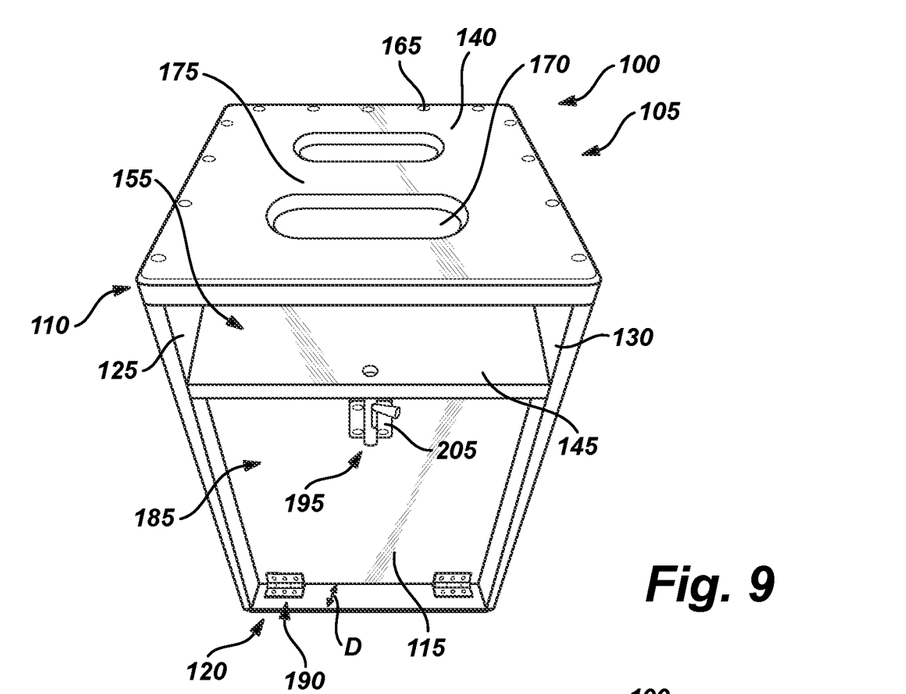
FIG. 9 is a top perspective view of at least some exemplary embodiments of the present invention.
Figure 10:
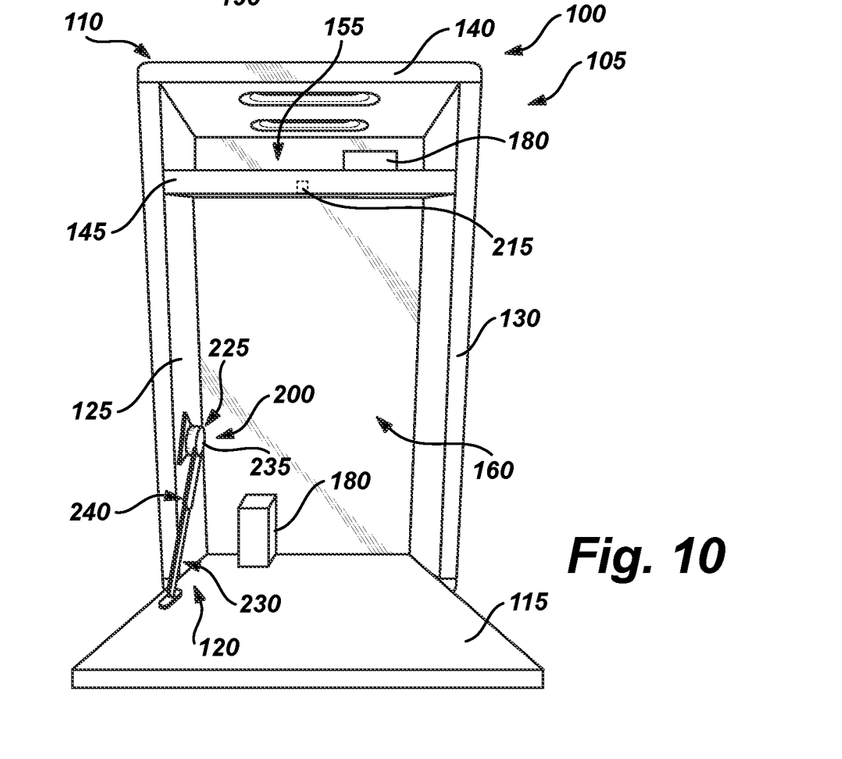
FIG. 10 is a front perspective view of at least some exemplary embodiments of the present invention.

Member 115 may be moved between the closed position illustrated in FIG. 9 and the open position illustrated in FIG. 10 (e.g., and any desired position in between the closed position and the open position). Returning to FIG. 1, member 115 may be recessed into cavity 160 to form a recess 185 (e.g., when member 115 is in the closed position). Recess 185 may be configured to provide space or clearance for fitting components of movement assembly 120 for example as described below. For example, recess 185 may have a sufficient depth to receive components of movement assembly 120 without the components extending out of recess 185 (e.g., beyond front portions of side members 125 and 130, intermediate member 145, and bottom member 150). For example, at least some components of movement assembly 120 may be completely disposed in recess 185. For example as illustrated in FIG. 1, recess depth D may be deep enough so that apparatus 105 may be disposed flat on a ground surface when member 115 is in the closed position, without a portion of movement assembly 120 extending or jutting out (e.g., breaking a plane) of recess 185. Recess depth D may be any suitable depth such as, for example, between about ½" and about 2" or larger, or any other desired distance.

As illustrated in FIGS. 1 and 8, movement assembly 120 may include one or more movable connectors 190, one or more fastener assemblies 195, and one or more support assemblies 200. The one or more movable connectors 190, fastener assemblies 195, and support assemblies 200 may operate together to support member 115 when member 115 is in the open position and the closed position and as member 115 moves between the open and closed position.

Movable connector 190 may be any suitable connector for movably attaching member 115 to body assembly 110. For example, one or more movable connectors 190 may movably connect member 115 (e.g., an end portion of member 115) to bottom member 150 (e.g., and/or to any other exemplary disclosed member of body assembly 110). A first portion of movable connector 190 may be attached to member 115 by any suitable technique such as via screws or bolts other mechanical connectors, adhesive, welding, and/or any other suitable attachment method. A second portion of movable connector 190 may be similarly attached to bottom member 150 (e.g., and/or to any other exemplary disclosed member of body assembly 110). One or more movable connectors 190 may rotatably attach member 115 to body assembly 110. In at least some exemplary embodiments, movable connector 190 may be a hinge such as a metal hinge (e.g., a steel hinge or a zinc alloy hinge). Member 115 may remain connected to bottom member 150 as member 115 rotates about the one or more movable connectors 190 between the open and closed position. The one or more movable connectors 190 may be disposed within recess 185 for example as described above.

Fastener assembly 195 may be any suitable fastener for selectively locking or fastening member 115 to body assembly 110. Fastener assembly 195 may be formed from any suitable material for structural hardware such as, for example, steel or zinc alloy. For example, one or more fastener assemblies 195 may selectively lock or fasten member 115 (e.g., an end portion of member 115) to intermediate member 145 (e.g., and/or to any other exemplary disclosed member of body assembly 110). Fastener assembly 195 may include a fastener 205 that may be attached to member 115 by any suitable technique such as via screws or bolts other mechanical connectors, adhesive, welding, and/or any other suitable attachment method. Fastener 205 may be a retractable locking device. Fastener 205 may include a movable protruding member 210 that may be movably supported by fastener 205. For example, movable protruding member 210 may be movable supported by a body of fastener 205 so that movable protruding member 210 may extend from and retract into the body of fastener 205. Movable protruding member 210 may be removably received in a locking recess 215 of intermediate member 145 (e.g., and/or of any other exemplary disclosed member of body assembly 110). Locking recess 215 may be for example a recess provided in the exemplary disclosed member via drilling, etching, machining or any other suitable technique. Movable protruding member 210 may include a side protrusion for rotating movable protruding member 210 (e.g., between a position that blocks movable protruding member 210 from moving, and a position in which movable protruding member 210 is urged to extend from the body of fastener 205 for example by a spring of fastener 205). Movable protruding member 210 may be a bolt. In at least some exemplary embodiments, fastener 205 may be a spring-loaded assembly that urges movable protruding member 210 into locking recess 215 when movable protruding member 210 is aligned with locking recess 215 (e.g., when member 115 is in the closed position). Member 115 may be locked in the closed position when movable protruding portion 210 is received in locking recess 215, and may be selectively unlocked when a user actuates movable protruding portion 210 to move out of locking recess 215 (e.g., based on pressing on the exemplary disclosed side protrusion to rotate and move movable protruding portion 210). In at least some exemplary embodiments, fastener assembly 195 may be a spring-loaded barrel bolt assembly and movable protruding member 210 may be a spring-loaded barrel bolt. The one or more fastener assemblies 195 may be disposed within recess 185 for example as described herein. Fastener assembly 195 may also be any other suitable type of connector such as, for example, a magnetic connector, a snap-fit connector, a hook and loop fastener, a friction-fit locking device, a compressible locking device, or any other suitable connector.

In at least some exemplary embodiments, fastener assembly 195 may be attached to intermediate member 145 and be disposed in cavity 155, with movable protruding portion 210 movably extendable through an aperture extending through intermediate member 145 and removably receivable in a recess of member 115 that may be similar to locking recess 215 (e.g., to selectively lock member 115 in place). In such an exemplary embodiment, an exterior surface of member 115 may be flush with front portions of side members 125 and 130, intermediate member 145, and bottom member 150 so that substantially no recess 185 is formed. In such an exemplary embodiment, movable connectors 190 may be disposed in cavity 160 and may be attached to an interior surface portion of member 115 that faces cavity 160.

In at least some exemplary embodiments, one or more fastener assemblies 195 may be attached to an opposite side of member 115 as one or more movable connectors 190. For example as illustrated in FIGS. 1 and 2, a plurality of movable connectors 190 may be attached to a bottom end portion of member 115 (e.g., at each bottom corner of member 115), and a fastener 205 may be attached at a top portion of member 115 (e.g., at a top center of member 115) adjacent to intermediate member 145.

Support assembly 200 may be any suitable support assembly for supporting a movement of member 115 between the closed position and the open position. Support assembly 200 may also support member 115 at any desired position between the closed position and the open position (e.g., at any desired angle relative to a support surface 220 such as a table, floor, or ground surface on which apparatus 105 may be supported for example as illustrated in FIG. 2). Support assembly 200 may also move member 115 between the open position and the closed position at a desired (e.g., predetermined) speed for example as described below.

As illustrated in FIGS. 8 and 10, support assembly 200 may be movably disposed in cavity 160. Support assembly 200 may be formed from any suitable material for structural hardware such as, for example, steel or zinc alloy. Support assembly 200 may include a damper member assembly 225 and a pivot member assembly 230. Damper member assembly 225 may be rotatably attached to side member 125 or side member 130 (e.g., or any other suitable exemplary disclosed member) of body assembly 110 via any suitable fastener or device (e.g., via an attachment plate). Pivot member assembly 230 may be similarly rotatably attached to member 115. Damper member assembly 225 and pivot member assembly 230 may be rotatably attached to each other via any suitable technique such as, for example, a hinge 240. Hinge 240 may stop a relative rotation of damper member assembly 225 and pivot member assembly 230 when member 115 is in the open position (e.g., fully open position for example as illustrated in FIG. 8). Damper member assembly 225 and pivot member assembly 230 may thereby rotate relative to each other and to respective portions of body assembly 110 and member 115 when member 115 moves between the open and closed position.

Damper member assembly 225 may include a damper assembly 235 that may include any suitable damping devices for damping a movement of support assembly 200 and member 115. Damper assembly 235 may include for example a hydraulic or viscous damper, urging members such as springs, a hinge cup damper, or any other suitable damping device. Damper assembly 235 may include an adjuster such as an adjustment screw for adjusting a damping force of damper assembly 235. Damper assembly 235 may thereby be adjusted by a user to adjust a speed at which damper member assembly 225 and pivot member assembly 230 move relative to each other, and thereby a speed at which member 115 moves relative to body assembly 110 (e.g., based on support assembly 200 being attached between body assembly 110 and member 115). Support assembly 200 may also include any suitable urging members (e.g., springs or other suitable members such as elastic members) for urging damper member assembly 225 and pivot member assembly 230 between the open and closed positions.

A single support assembly 200 or a plurality of support assemblies 200 may be attached between body assembly 110 and member 115. In at least some exemplary embodiments and as illustrated in FIGS. 8 and 10, one support assembly 200 may be disposed in cavity 160 and attached between an interior surface of side member 125 or side member 130 and an interior surface of member 115.

An exemplary use of system 100 will now be described. In at least some exemplary embodiments, the exemplary disclosed system, apparatus, and method may allow a user to easily handle apparatus 105 for use in supporting equipment and storing material. For example, the exemplary disclosed system, apparatus, and method may allow a user to easily handle and manipulate apparatus 105 with one hand. That is, the exemplary disclosed features of at least some exemplary embodiments of the exemplary disclosed system, apparatus, and method may make apparatus 105 agronomical for handling by a user.

A user may grip handle portion 175 (e.g., with one hand) by placing fingers and a thumb through apertures 170 and into cavity 155. Also for example, apparatus 105 may support a user's weight so that the user may sit on apparatus 105 (e.g., during a shot during film or video production or during other activities for example as described herein). Apparatus 105 may also support equipment for example as described herein.

In at least some exemplary embodiments, a user may sit on top member 140 when apparatus 105 is in a vertical or standing position for example as illustrated in FIG. 1. From this position, the user may easily access material stored in cavities 155 and/or 160 as desired. For example, the user may reach down to operate fastener assembly 195 to unlock member 115 for example as described herein (e.g., a user may actuate movable protruding member 210 to be removed from locking recess 215). The user may unlock member 115 with one hand while sitting on apparatus 105, or may stand and tilt apparatus 105 backward with one hand gripping handle portion 175 while the user's other hand actuates fastener assembly 195.

When the user operates fastener assembly 195 to unlock member 115, support assembly 200 may operate to partially or substantially fully automatically move member 115 from the closed position to the open position based for example on the exemplary disclosed configuration of support assembly 200 as described herein, based on gravity depending on an orientation of apparatus 105 relative to support surface 220, and/or pushing or urging by the user. Member 115 may move at a speed based on a setting of support assembly 200 that may be set by the user (e.g., via the exemplary disclosed adjuster). Member 115 may be moved from the closed position illustrated for example in FIG. 9 to the open position illustrated for example in FIG. 10. When member 115 is in the open position (e.g., or a partially open position), the user may remove material (e.g., material 180) from cavity 160.

When the user wishes to close member 115 to close cavity 160, member 115 may be moved from the open position to the closed position based on the exemplary disclosed operation and configuration of support assembly 200 for example as described herein, based on gravity depending on an orientation of apparatus 105 relative to support surface 220, and/or pushing or urging by the user. For example, support assembly 200 may operate to automatically close member 115 and/or may operate to urge member 115 toward the closed position of FIG. 9 in combination with gravity and/or a user pushing member 115.

When apparatus 105 is in the closed position, apparatus 105 may be placed on a surface (e.g., support surface 220) in any desired orientation. For example, the exterior surface of any of side member 125, side member 130, back member 135, top member 140, and bottom member 150 may face and abut against support surface 220 to support apparatus 105. Also for example based on the exemplary disclosed components of movement assembly 120 being disposed in recess 185 or cavity 160, apparatus 105 may be placed with an exterior surface of member 115 facing support surface 220 and with front portions of side member 125, side member 130, top member 140, intermediate member 145, and bottom member 150 abutting (e.g., abutting in a substantially flush manner) against support surface 220 to support apparatus 105.

Figure 11:
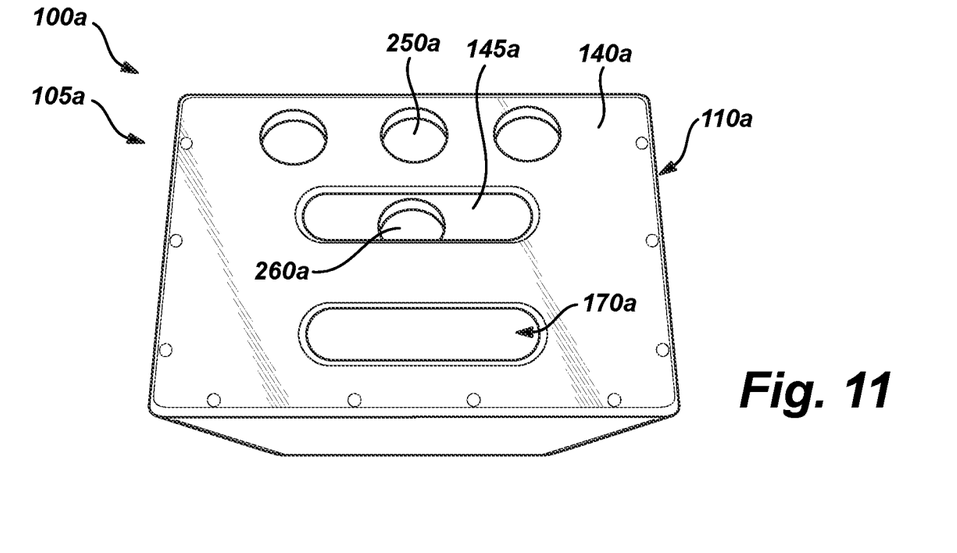
FIG. 11 is a top perspective view of at least some exemplary embodiments of the present invention.
Figure 12:
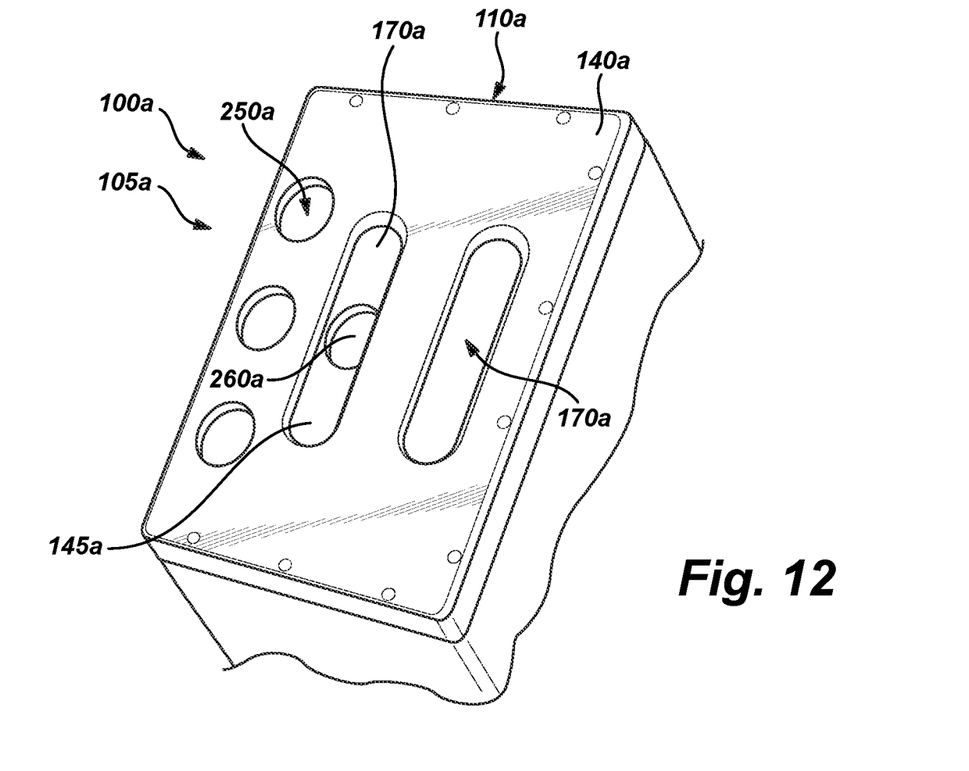
FIG. 12 is a top perspective view of at least some exemplary embodiments of the present invention.

FIGS. 11 and 12 illustrate another exemplary embodiment of the exemplary disclosed system, apparatus, and method. System 100a may be generally similar to system 100 and may include an apparatus 105a that may be similar to apparatus 105 and that may include a body assembly 110a that may be similar to body assembly 110. Body assembly 110a may include a top member 140a that may be similar to top member 140 and that may include one or more apertures 170a that may be similar to aperture 170. Top member 140a may also include a plurality of apertures 250a that may be configured to support any desired object such a beverage container, an elongated member (e.g., a boom used in film or video production), and/or any other suitable object. Body assembly 110a may also include an intermediate member 145a that may be similar to intermediate member 145. Intermediate member 145a may include an aperture 260a that may be configured similarly to aperture 250a. Aperture 260a may extend through a thickness of intermediate member 145a so that cavities of apparatus 105a that may be similar to cavities 155 and 160 may communicate with aperture 260a. Aperture 250a and aperture 260a may be substantially aligned. For example, an elongated object (e.g., such as a boom) may be inserted through aperture 250a, aperture 260a, and the cavities that may be similar to cavities 155 and 160 so that the elongated object may be supported by apparatus 105.

The exemplary disclosed system, apparatus, and method may be used in any suitable application for storing material and equipment for any suitable activity. For example, the exemplary disclosed system, apparatus, and method may be used for supporting camera equipment and/or providing storage for technicians working in film and video production. Also for example, the exemplary disclosed system, apparatus, and method may be used by trades workers and/or in the construction industry by construction workers. The exemplary disclosed system, apparatus, and method may also be used in exhibitions and fairs such as trade shows, and/or hobby conventions such as trading card shows and science fiction conventions. The exemplary disclosed system, apparatus, and method may be used in any suitable activity involving storing material and/or supporting equipment or objects.

In at least some exemplary embodiments, the exemplary disclosed apparatus may include a housing that may be a rectangular prism having five substantially flat sides and an open side that is open to a cavity formed by the housing, an intermediate member disposed in the housing and dividing the cavity into a first cavity (e.g., cavity 155) and a second cavity (e.g., cavity 160), a member (e.g., member 115) that may be movably attached to the housing via at least one movable connector, the member movable about the at least one movable connector between an open position allowing access to the second cavity and a closed position covering the second cavity, a support assembly disposed in the second cavity and attaching the member to the housing, and a fastener assembly attached to the member and selectively locking the member to the intermediate member when the member is in the closed position. The member may form a recess at the open side of the housing when the member is in the closed position covering the second cavity. The fastener assembly and the at least one movable connector may be disposed in the recess when the member is in the closed position. The fastener assembly may be attached to a first end portion of the member and the at least one movable connector may be attached to a second end portion of the member that may be an opposite end portion of the member as the first end portion. The fastener assembly may include a movable bolt that may be removably received in a recess of the intermediate member, and the at least one movable connector may include two hinges rotatably attaching the member to the housing. The support assembly may include a damper member assembly having a first end portion that may be rotatably attached to the housing and a second end portion that may be rotatably attached to a first end portion of a pivot member assembly, and a second end portion of the pivot member assembly may be rotatably attached to the member. The damper member assembly may include a damper having an adjuster that may adjust a speed of relative rotation between the damper member assembly and the pivot member assembly based on the damper. The damper may control a speed of relative rotation of the member relative to the housing about the at least one movable connector, which may be at least one rotatable connector, based on the attachment of the support assembly between the member and the housing. The fastener assembly may include a spring-loaded bolt that may be removably received in a locking recess of the intermediate member when the member is in the closed position. The housing may include at least two apertures that may extend through a thickness of the housing into the first cavity, and wherein a handle portion may extend between the at least two apertures. The second cavity may be a storage area that may be between about five and about six times larger than the first cavity that may be configured to receive a user's hand via the at least two apertures. The housing may be a portable housing having an overall height of between about 12" and about 30", an overall width of between about 6" and about 24", and an overall thickness of between about 1" and about 8".

In at least some exemplary embodiments, the exemplary disclosed method may include providing a housing that may be a rectangular box having five substantially flat sides and an open side that is open to a cavity formed by the housing, providing an intermediate member disposed in the housing and dividing the cavity into a first cavity (e.g., cavity 155) and a second cavity (e.g., cavity 160), providing a member (e.g., member 115) that may be movably attached to the housing via at least one movable connector, and guiding a movement of the member about the at least one movable connector between an open position allowing access to the second cavity and a closed position covering the second cavity using a support assembly that is disposed in the second cavity and that is attached between the member and the housing. The exemplary disclosed method may also include selectively locking the member to the intermediate member when the member is in the closed position using a fastener assembly attached to the member, forming a recess at the open side of the housing with the member when the member is in the closed position covering the second cavity, supporting equipment with the housing, and storing material in the second cavity. The fastener assembly and the at least one movable connector may be disposed in the recess when the member is in the closed position. Supporting equipment with the housing may include supporting camera equipment. The exemplary disclosed method may also include moving the housing based on a user's hand being received via at least two apertures that may extend through a thickness of the housing into the first cavity and the user's hand gripping a handle portion extending between the at least two apertures.

In at least some exemplary embodiments, the exemplary disclosed apparatus may include a housing including two side members, a top member, a bottom member, and a back member that form a rectangular box having five substantially flat sides and an open side that is open to a cavity formed by the housing, an intermediate member disposed in the housing and dividing the cavity into a first cavity (e.g., cavity 155) and a second cavity (e.g., cavity 160), a member (e.g., member 115) that may be movably attached to the housing via at least one rotatable connector, the member movable about the at least one rotatable connector between an open position allowing access to the second cavity and a closed position covering the second cavity, a support assembly disposed in the second cavity and attaching the member to the housing, and a fastener assembly attached to the member and selectively locking the member to the intermediate member when the member is in the closed position. The member may form a recess at the open side of the housing when the member is in the closed position covering the second cavity. The fastener assembly and the at least one rotatable connector may be completely disposed within the recess when the member is in the closed position. Each of the member and the back member may have a first thickness. Each of the two side members, the top member, the bottom member, and the intermediate member may have a second thickness. The first thickness may be less than the second thickness. A first aperture may extend through a thickness of the top member into the first cavity. A second aperture may extend through a thickness of the intermediate member between the first cavity and the second cavity. The first aperture may be aligned with the second aperture in a longitudinal direction of the housing. The two side members, the top member, the bottom member, the back member, and the intermediate member may be birch plywood members that may be fastened together via countersunk fasteners. When the member is in the closed position covering the second cavity, the recess may be formed by the member that is recessed in the second cavity, a front portion of the intermediate member, a front portion of the bottom member, and a front portion of each of the two side members. Top surfaces of the front portion of the intermediate member, the front portion of the bottom member, the front portion of each of the two side members, and a front portion of the top member may be flush so that substantially all of the top surfaces abut a support surface when the recess faces the support surface.

In at least some exemplary embodiments, the exemplary disclosed system, apparatus, and method may provide an efficient and effective system for providing storage in a support assembly used in applications such as film and video production (e.g., such as an apple box). The exemplary disclosed system, apparatus, and method may provide a lightweight and durable support assembly that may be suitable for both efficiently supporting equipment and also for housing material and equipment.

It will be apparent to those skilled in the art that various modifications and variations can be made to the exemplary disclosed apparatus, system, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. An apparatus, comprising:
   a housing that is a rectangular prism having five substantially flat sides and an open side that is open to a cavity formed by the housing;
   an intermediate member disposed in the housing and dividing the cavity into a first cavity and a second cavity;
   a member that is movably attached to the housing via at least one movable connector, the member movable about the at least one movable connector between an open position allowing access to the second cavity and a closed position covering the second cavity;
   a support assembly disposed in the second cavity and attaching the member to the housing; and
   a fastener assembly attached to the member and selectively locking the member to the intermediate member when the member is in the closed position;
   wherein the member forms a recess at the open side of the housing when the member is in the closed position covering the second cavity, based on the member being disposed within the housing so that the member is recessed into the second cavity; and
   wherein the fastener assembly and the at least one movable connector are completely disposed in the recess and outside of the second cavity when the member is in the closed position based on a depth of the recess being greater than a height of each of the fastener assembly and the at least one movable connector when the member is in the closed position.

2. The apparatus of claim 1, wherein the fastener assembly is attached to a first end portion of the member and the at least one movable connector is attached to a second end portion of the member that is an opposite end portion of the member as the first end portion.

3. The apparatus of claim 2, wherein the fastener assembly includes a movable bolt that is removably received in a bolt recess of the intermediate member, and the at least one movable connector includes two hinges rotatably attaching the member to the housing.

4. The apparatus of claim 1, wherein the support assembly includes a damper member assembly having a first end portion that is rotatably attached to the housing and a second end portion that is rotatably attached to a first end portion of a pivot member assembly, and a second end portion of the pivot member assembly is rotatably attached to the member.

5. The apparatus of claim 4, wherein the damper member assembly includes a damper that adjusts a speed of relative rotation between the damper member assembly and the pivot member assembly based on the damper.

6. The apparatus of claim 5, wherein the damper controls a speed of relative rotation of the member relative to the housing about the at least one movable connector, which is at least one rotatable connector, based on the attachment of the support assembly between the member and the housing.

7. The apparatus of claim 1, wherein the fastener assembly includes a spring-loaded bolt that is removably received in a locking recess of the intermediate member when the member is in the closed position.

8. The apparatus of claim 1, wherein the housing includes at least two apertures that extend through a thickness of the housing into the first cavity, and wherein a handle portion extends between the at least two apertures.

9. The apparatus of claim 8, wherein the second cavity is a storage area that is between five and six times larger than the first cavity that is configured to receive a user's hand via the at least two apertures.

10. The apparatus of claim 1, wherein the housing is a portable housing having an overall height of between about 12" and about 30", an overall width of between about 6" and about 24", and an overall thickness of between about 1" and about 8".

11. A method, comprising:
    providing a housing that is a rectangular box having five substantially flat sides and an open side that is open to a cavity formed by the housing;
    providing an intermediate member disposed in the housing and dividing the cavity into a first cavity and a second cavity;
    providing a member that is movably attached to the housing via at least one movable connector;
    guiding a movement of the member about the at least one movable connector between an open position allowing access to the second cavity and a closed position covering the second cavity using a support assembly that is disposed in the second cavity and that is attached between the member and the housing, the member disposed parallel to the intermediate member and also abutting against one of the five substantially flat sides when in the open position;
    selectively locking the member to the intermediate member when the member is in the closed position using a fastener assembly attached to the member;
    forming a recess at the open side of the housing with the member when the member is in the closed position covering the second cavity;

supporting camera equipment with the housing during film or television production; and storing material in the second cavity.

12. The method of claim 11, wherein the fastener assembly and the at least one movable connector are disposed in the recess when the member is in the closed position.

13. The method of claim 11, wherein supporting equipment with the housing includes supporting camera equipment.

14. The method of claim 11, further comprising moving the housing based on a user's hand being received via at least two apertures that extend through a thickness of the housing into the first cavity and the user's hand gripping a handle portion extending between the at least two apertures.

15. An apparatus, comprising:
a housing including two side members, a top member, a bottom member, and a back member that form a rectangular box having five substantially flat sides and an open side that is open to a cavity formed by the housing;
an intermediate member disposed in the housing and dividing the cavity into a first cavity and a second cavity;
a member that is movably attached to the housing via at least one rotatable connector, the member movable about the at least one rotatable connector between an open position allowing access to the second cavity and a closed position covering the second cavity;
a support assembly disposed in the second cavity and attaching the member to the housing; and
a fastener assembly attached to the member and selectively locking the member to the intermediate member when the member is in the closed position;
wherein the member forms a recess at the open side of the housing when the member is in the closed position covering the second cavity, based on the member being disposed within the housing so that the member is recessed into the second cavity; and
wherein the fastener assembly and the at least one rotatable connector are completely disposed within the recess and outside of the second cavity when the member is in the closed position based on a depth of the recess being greater than a height of each of the fastener assembly and the at least one rotatable connector when the member is in the closed position.

16. The apparatus of claim 15, wherein:
each of the member and the back member have a first thickness;
each of the two side members, the top member, the bottom member, and the intermediate member have a second thickness; and
the first thickness is less than the second thickness.

17. The apparatus of claim 15, wherein the two side members, the top member, the bottom member, the back member, and the intermediate member are birch plywood members that are fastened together via countersunk fasteners.

18. The apparatus of claim 15, wherein when the member is in the closed position covering the second cavity, the recess is formed by the member that is recessed in the second cavity, a front portion of the intermediate member, a front portion of the bottom member, and a front portion of each of the two side members.

19. The apparatus of claim 18, wherein top surfaces of the front portion of the intermediate member, the front portion of the bottom member, the front portion of each of the two side members, and a front portion of the top member are flush so that substantially all of the top surfaces abut a support surface when the recess faces the support surface.

20. The method of claim 11, further comprising supporting a boom during the film or television production by inserting the boom through a first aperture that extends through the housing and a second aperture that extends through the intermediate member.

* * * * *